May 17, 1932. T. LEONARD 1,858,367
TRAP NEST
Filed March 27, 1929 2 Sheets-Sheet 1
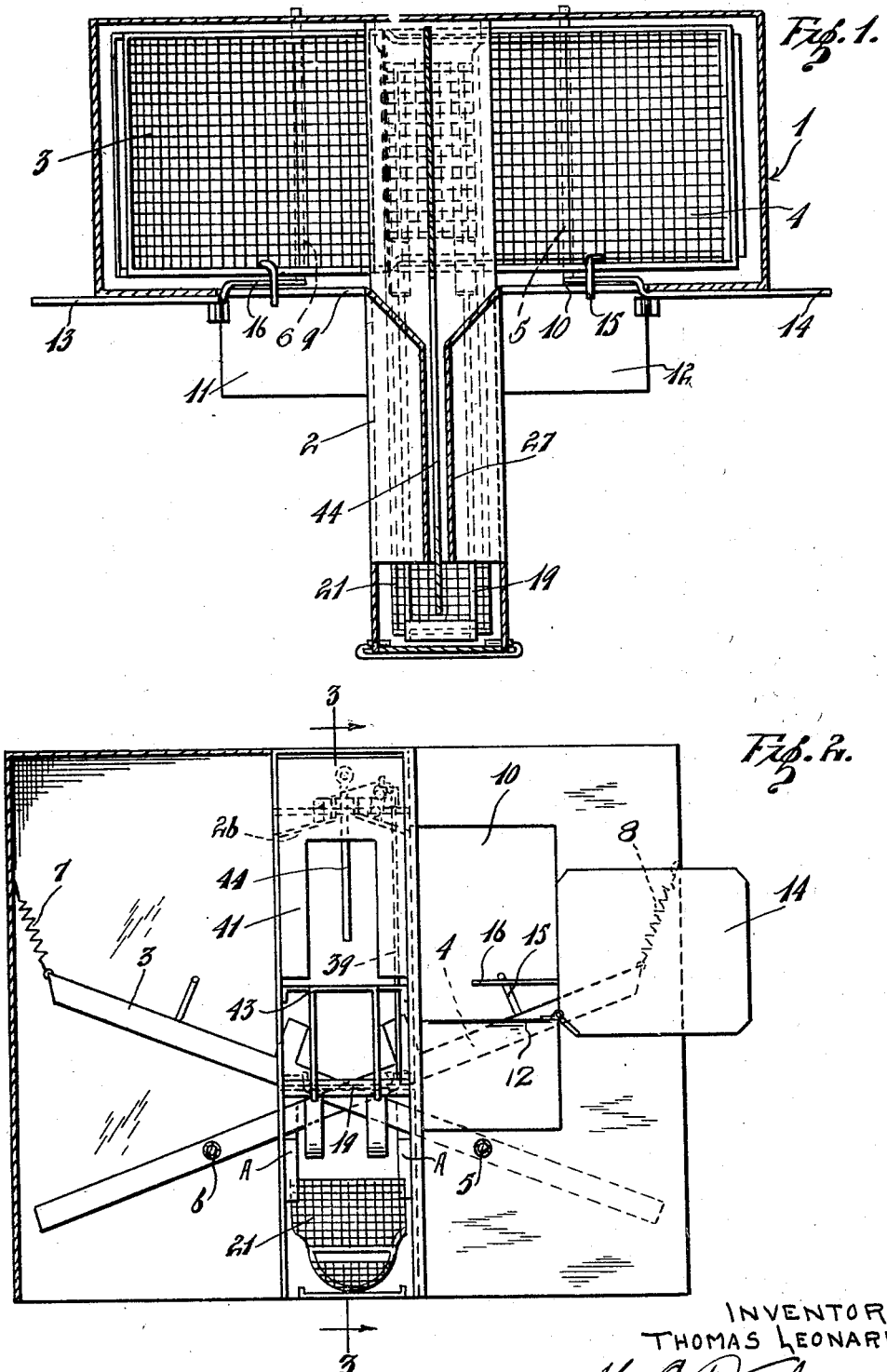
INVENTOR
THOMAS LEONARD.
ATTORNEY.

May 17, 1932.  T. LEONARD  1,858,367
TRAP NEST
Filed March 27, 1929    2 Sheets-Sheet 2
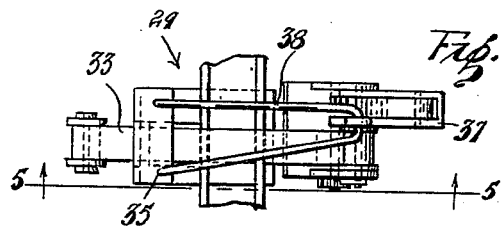
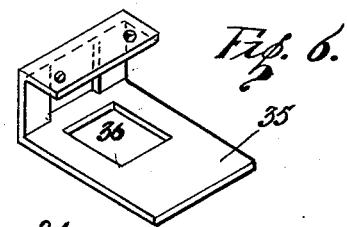
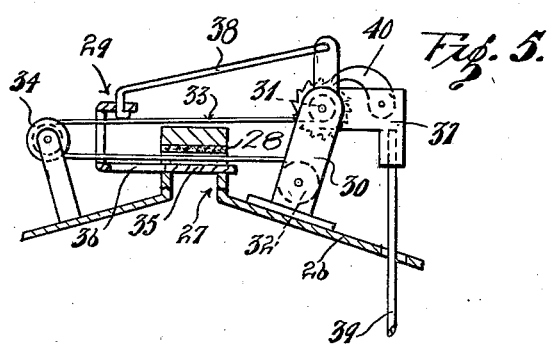
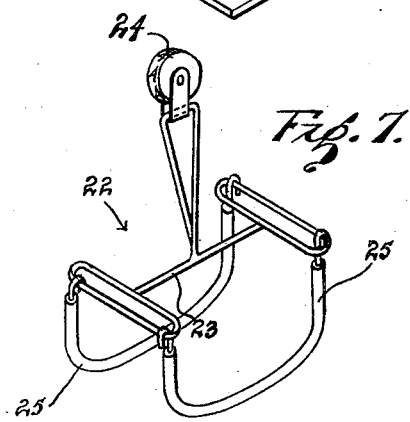
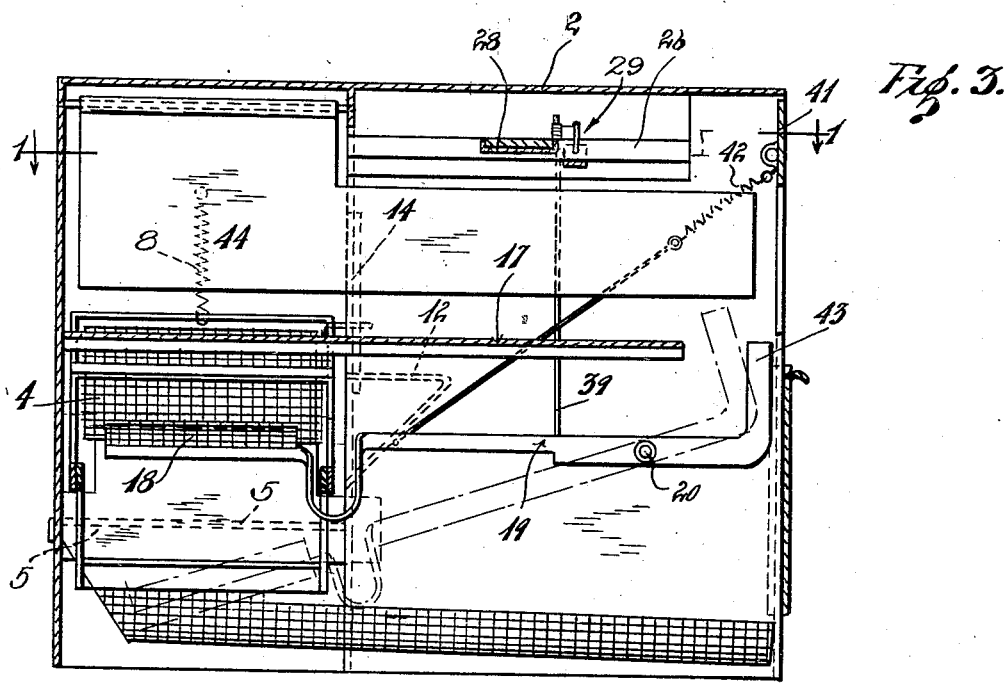
INVENTOR
THOMAS LEONARD,
by
ATTORNEY.

Patented May 17, 1932

1,858,367

UNITED STATES PATENT OFFICE

THOMAS LEONARD, OF COMPTON, CALIFORNIA, ASSIGNOR TO LEONARD AUTOMATIC SURE KNO TRAPNEST CO., LTD., OF LOS ANGELES, CALIFORNIA, A CORPORATION

TRAP NEST

Application filed March 27, 1929. Serial No. 350,262.

This invention relates to an automatic trap nest in which a record is automatically kept when the hen lays an egg.

An object of my invention is to provide a trap nest which does not require an attendant or operator to remove the hen and make a record of the egg laid, and further to provide a trap nest which the hen may enter or leave at will.

Another object is to provide a trap nest in which a ribbon or tape is provided upon which a mark or number is placed by the hen after she lays the egg.

A further object is to provide a novel trap nest in which the recording mechanism is not exposed if an egg is not laid.

Other objects, advantages, and features of invention may appear from the accompanying drawings, the subjoined detailed description, and the appended claims.

In the drawings:

Figure 1 is a transverse sectional view of my trap nest taken on the line 1—1, Figure 3.

Figure 2 is a front elevation of the nest, the left portion of which is broken away to show interior construction.

Figure 3 is a sectional view taken on line 3, 3, Figure 2.

Figure 4 is a fragmentary plan view of the tape actuating mechanism.

Figure 5 is a sectional view taken on line 5, 5, Figure 4.

Figure 6 is a perspective view of the tape shutter.

Figure 7 is a perspective view of the yoke which is secured to the hen.

Referring more particularly to the drawings, the numeral 1 indicates the nest compartment in which two nests are provided, as will be further described. A central exit passageway 2 is provided centrally between the nests and extending from the nest compartment the hen passing through this exit after she leaves the nest.

In the compartment 1 I provide two nests 3, 4. The nest 3 extends into the space occupied by the nest 4 and is pivoted, as at 5. Similarly, the nest 4 is pivoted at 6. Both the nests 3, 4 are held in the inclined position shown in Figure 2 by means of light springs 7 and 8. The nests 3, 4 are each constructed with a rectangular frame, preferably formed of metal. The pivots 5, 6 each consist of a bar which extends through the frame and through the walls of the compartment 1.

The hen enters the compartment 1 through the opening 9 or 10 in the front wall thereof and stands upon a platform 11, 12, prior to entering. Doors 13, 14 are hingedly mounted on the platforms 11, 12, respectively, and these doors are adapted to swing to close the openings 9 or 10. The nests 3, 4 are each provided with an outwardly extending finger 15 which engages a bar 16 secured to the doors 13 or 14. Thus it will be seen that when the hen enters the opening and sits on one of the nests 3 or 4, the nest will be depressed under her weight and said nest in moving downwardly will swing the door 13 or 14 to close the opening to the nest. When the hen leaves the nest, the finger 15 engages the bottom of the door thus swinging said door open to allow another hen to enter.

After the hen has laid the egg she steps upon the board 17 which extends lengthwise through the exit passage 2. The nest then rises to its inclined position, as shown in Figure 2, and the egg rolls into a basket 18 mounted upon an arm 19, said arm being pivoted at 20 in the exit passage 2. The weight of the egg in the basket 18 will depress the arm 19 to the position shown in dotted lines in Figure 3 and the egg then rests at the upper end of the accumulating basket 21.

Each of the hens is provided with a yoke 22 which comprises a light metal frame 23 which is made of flexible material such as spring steel or wire, and at the top of this frame there is rotatably mounted a roller 24 with figures on the periphery thereof. A pair of bands 25, 25 are secured to the frame 23 and these bands encircle each wing and leg of the fowl so that the yoke is held securely in position. It has been found in actual practice that this light yoke in no way interferes with the hen.

As previously stated the hen leaves the nest 3 or 4 and steps upon the central board 17. The passage 2 is provided with a peaked roof 26 and is formed with a channel 27 in the top thereof. An inking pad 28 is positioned in the channel 27 and as the hen leaves the nest the roller 24 rolls over the pad and then passes over the recording tape mechanism 29. The tape mechanism comprises a frame 30 upon which the new and used spools 31, 32 are journaled and the tape 33 is wound upon these spools. An idler spool 34 is journaled on a frame and the tape 33 passes over the channel 27 and the lower reach of the same passes through the channel, as shown in Figure 5.

A shutter 35 is slidably mounted in the channel 27 below the tape 33 and normally covers said tape. An opening 36 is provided in the shutter 35 and when the shutter is moved so as to carry the opening 36 within the channel 27 the tape 33 will be exposed and can be printed with a number on the roller 24 as the hen leaves the nest.

The shutter is actuated through a bell crank lever 37 and links 38 extend from the bell crank lever to the shutter. A rod 39 is connected to the bell crank lever 37 and to the arm 19. Thus, as the egg depresses the arm 19, as previously described, the bell crank lever 37 will be swung to operate the shutter 35 and expose the tape 33. A pawl 40 on the bell crank lever 37 serves to reel a clean section of the tape 33 in the channel 27.

An exit door 41 is pivoted to the forward end of the passage 2 and a spring 42 is connected to said door and to the arm 19. Thus, as the hen leaves the nest, swinging the door 41 outwardly, the arm 19 will again be pulled upwardly to the position shown in solid lines in Figure 3. The egg remains in the basket 21 and rolls to the front thereof and is later collected. The arm 19 is also assisted in returning to its normal position by a step 43 which is formed on the forward end thereof. The hen will stand upon this step as she leaves the nest, thus swinging the arm 19 upwardly.

In order that two hens cannot simultaneously walk into the exit passage 2 I provide a curtain 44 which is hinged at the top thereof and extends longitudinally of the passage 2. Either hen in leaving the nest moves this curtain to one side thus holding the other hen in the nest. After the one hen has left the curtain drops to its normal vertical position and the other hen can then leave the nest.

At the end of the day the poultryman takes the eggs from the basket 21 in the order in which they lie and by checking against the numbers on the tape 33 he can ascertain exactly which egg was laid by any particular hen. That is, the first number on the tape 33 will be the first egg at the front of the basket, and so forth.

Having described my invention, I claim:

1. A trap nest for fowls comprising a nest compartment, a pair of nests pivotally mounted in said compartment, an exit passage between said nests and open thereto, an egg tray pivotally mounted in said passage, said egg tray being adapted to be depressed by the egg laid by the fowl, recording means in said passage, means operatively connecting said egg tray and recording means whereby the recording means is exposed when said tray is depressed, said recording means being acted upon by the fowl as it leaves the nest.

2. A trap nest for fowls comprising a nest compartment, a pair of nests pivotally mounted in said compartment, an exit passage between said nests and open thereto, an egg tray pivotally mounted in said passage, said egg tray being adapted to be depressed by the egg laid by the fowl, recording means in said passage, means operatively connecting said egg tray and recording means whereby the recording means is exposed when said tray is depressed, said recording means being acted upon by the fowl as it leaves the nest, said nest compartment having entrance openings therein, a door hingedly mounted adjacent each of said entrance openings, and means secured to said nests and engaging said door whereby the door is closed as the fowl enters the nest.

3. A trap nest for fowls comprising a nest compartment, a pair of nests pivotally mounted in said compartment, spring means normally urging said nests to an inwardly inclined position, a central exit passage, an egg tray pivotally mounted in said exit passage, said egg tray being adapted to receive the egg when laid by the fowl, a recording means in said exit passage, operative means connecting said recording means and said egg tray, whereby the recording mechanism is exposed when the egg enters the tray, said recording means being acted upon by the fowl as it leaves the nest.

4. A trap nest for fowls comprising a nest compartment, a pair of nests pivotally mounted in said compartment, an exit passage between said nests and open thereto, an egg tray pivotally mounted in said passage, said egg tray being adapted to be depressed by the egg laid by the fowl, a tape extending across said exit passage, spools upon which the tape winds, a shutter normally covering said tape, a rod extending from said shutter to said egg tray whereby the shutter is moved to expose the tape when the tray is depressed, said recording means being acted upon by the fowl as it leaves the nest.

5. A trap nest for fowls comprising a nest compartment, a pair of nests pivotally mounted in said compartment, spring means secured to said nests whereby they are held in an upwardly inclined position, said compartment having entrance openings therein, a door hingedly mounted adjacent each of said openings and adapted to close the same, an arm on the door, a finger on the nest engaging said arm whereby the door is closed as the nest is depressed, a central exit passage between said nests, an egg tray pivotally mounted in said exit passage, said egg tray being adapted to receive the egg the hen laid and to swing downwardly under the weight thereof, a collecting tray in the bottom of said exit passage, recording means in said exit passage, said recording means being acted upon by the fowl as it leaves the nest.

6. A trap nest for fowls comprising a nest compartment, a pair of nests pivotally mounted in said compartment, spring means secured to said nests whereby they are held in an upwardly inclined position, said compartment having entrance openings therein, a door hingedly mounted adjacent each of said openings and adapted to close the same, an arm on the door, a finger on the nest engaging said arm whereby the door is closed as the nest is depressed, a central exit passage between said nests, an egg tray pivotally mounted in said exit passage, said egg tray being adapted to receive the egg the hen laid and to swing downwardly under the weight thereof, a collecting tray in the bottom of said exit passage, recording means in said exit passage, said recording means being acted upon by the fowl as it leaves the nest, a door hingedly mounted in said exit passage, and spring means secured to said door and to said egg tray whereby the egg tray is raised as the fowl leaves the nest.

7. A trap nest for fowls comprising a nest compartment, a pair of nests pivotally mounted in said compartment, spring means secured to said nests whereby they are held in an upwardly inclined position, said compartment having entrance openings therein, a door hingedly mounted adjacent each of said openings and adapted to close the same, an arm on the door, a finger on the nest engaging said arm whereby the door is closed as the nest is depressed, a central exit passage between said nests, an egg tray pivotally mounted in said exit passage, said egg tray being adapted to receive the egg the hen laid and to swing downwardly under the weight thereof, a collecting tray in the bottom of said exit passage, a tape extending across said exit passage, spools upon which said tape is rolled, a shutter normally covering said tape, a rod extending from said shutter to said egg tray whereby the shutter is moved to expose the tape as said tray is depressed, a record being impressed on the tape by the fowl as it leaves the nest.

8. A trap nest for fowls comprising a nest compartment, a pair of nests pivotally mounted in said compartment, spring means secured to said nests whereby they are held in an upwardly inclined position, said compartment having entrance openings therein, a door hingedly mounted adjacent each of said openings and adapted to close the same, an arm on the door, a finger on the nest engaging said arm whereby the door is closed as the nest is depressed, a central exit passage between said nests, an egg tray pivotally mounted in said exit passage, said egg tray being adapted to receive the egg the hen laid and to swing downwardly under the weight thereof, a collecting tray in the bottom of said exit passage, a tape extending across said exit passage, spools upon which said tape is rolled, a shutter normally covering said tape, a rod extending from said shutter to said egg tray whereby the shutter is moved to expose the tape as said tray is depressed, a record being impressed on the tape by the fowl as it leaves the nest, a door hingedly mounted in said exit passage, and spring means secured to said door and to said egg tray whereby the egg tray is raised as the fowl leaves the nest.

9. A trap nest for fowls comprising a nest compartment, a pair of nests pivotally mounted in said compartment, an exit passage between said nests and open thereto, an egg tray pivotally mounted in said passage, said egg tray being adapted to be depressed by the egg laid by the fowl, recording means in said passage, means operatively connecting said egg tray and recording means whereby the recording means is exposed when said tray is depressed, said recording means being acted upon by the fowl as it leaves the nest, and a curtain in said exit passage extending longitudinally thereof, said curtain being hinged at its upper end and adapted to swing from side to side under the pressure of the fowl.

In testimony whereof, I affix my signature.

THOMAS LEONARD.